May 17, 1949.   P. E. FENTON ET AL   2,470,740
REINFORCED SOCKET FOR SNAP FASTENERS

Filed Sept. 28, 1944

INVENTORS
Paul E. Fenton and
Otto J. Huelster
BY
Howard C. Thompson

Patented May 17, 1949

UNITED STATES PATENT OFFICE 2,470,740

REINFORCED SOCKET FOR SNAP FASTENERS

Paul E. Fenton, Middlebury, and Otto J. Huelster, Waterbury, Conn., assignors to Scovill Manufacturing Company, Waterbury, Conn., a corporation of Connecticut Application September 28, 1944, Serial No. 556,236

17 Claims. (Cl. 24—216)

This invention relates to the sockets of snap fasteners employing socket and stud parts adapted to be coupled and uncoupled. More particularly, the invention relates to sockets employing circumferentially arranged yieldable gripper fingers having means in the form of spring rings for reinforcing or increasing the spring properties of gripper fingers of this kind, thereby facilitating the construction of the socket member of thinner materials than would otherwise be necessary or, in other words, to provide a desired spring engagement between socket and stud parts with a minimum wall thickness in the construction of the socket member.

The novel features of the invention will be best understood from the following description, when taken together with the accompanying drawing, in which certain embodiments of the invention are disclosed, and in which the separate parts are designated by suitable reference characters in each of the views and in which.

Figure 1:
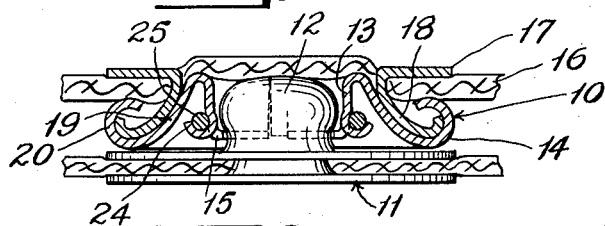
Fig. 1 is a sectional view diagrammatically illustrating one form of socket part with a conventional stud part engaging the same.

In Fig. 1 of the drawing, we have shown at 10 a socket part of a snap fastener and at 11 a conventional stud part secured to one support, the latter having a head 12 adapted to enter the socket part in engaging circumferentially arranged gripper fingers 13 of the socket member 14 of the socket part 10, or the inwardly extending gripper flanges 15 at the lower ends of said fingers. The socket member 14 of the socket 10 is secured to a support 16 by a pronged ring 17, the prongs 18 of which pass through the support 16 and downwardly over an imperforated and outwardly flared wall 19 of the member 14 and into an inturned curved peripheral flange 20 on the member 14.

Figure 2:
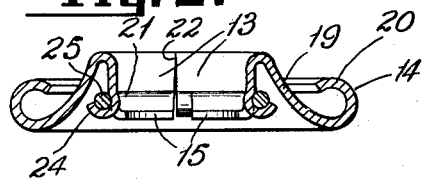
Fig. 2 is a view similar to Fig. 1 showing the socket member of the socket part detached.
Figure 3:
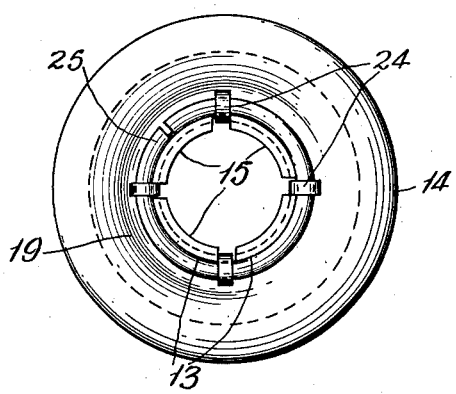
Fig. 3 is a bottom plan view of the structure, as seen in Fig. 2.

The wall 19, sometimes referred to as the annular breast wall on the socket member, terminates at its inner end in the downwardly extending gripper fingers 13, which have at their lower ends thereof the inwardly directed flanges 15. The fingers 13, when in blank formation, have inwardly offset lower ends, as seen at 21 in Fig. 4 of the drawing and at one side of each finger 13 adjacent the slits 22, which sub-divide the fingers 13 one from the other, the fingers are provided with extending tongue members 23 which extend from the upper end of the offset portions 21. These tongue members are adapted to be curled outwardly to form hook-shaped ring retaining members 24, as clearly seen in Fig. 2 of the drawing in supporting and retaining a split spring ring 25 upon outer surfaces of the fingers 13 in alinement with the upper end of the inwardly offset portions 21, as will clearly appear from a consideration of Fig. 2 of the drawing. It will be understood that the members 24 simply operate to retain the ring 25 against displacement from the fingers 13 and the split ring normally rests under slight tension upon the outer surfaces of the fingers to maintain their normal perpendicular position or position parallel with respect to the axis of the socket member. In some instances, however, the ring may be so constructed as to slightly urge the gripper fingers inwardly. It will be apparent that, in the passage of the head 12 into and out of the socket, the outward movement of the members 13 will operate to expand the spring ring and the ring will aid in returning the members to the normal gripping position, in which position the gripper flanges 15 will be arranged beneath the head 12 of the stud 11. With this construction, as with other forms of construction, as later described, it will be apparent that, by using a spring ring of the kind under consideration to reinforce or increase the spring properties of gripper fingers of the kind under consideration, the thickness of the material employed in the socket may be minimized and, when the socket member is composed of plastic materials, a split spring wire ring will operate to provide strong spring properties to plastic gripper fingers which would otherwise possess a light spring action upon the stud.

Figure 4:
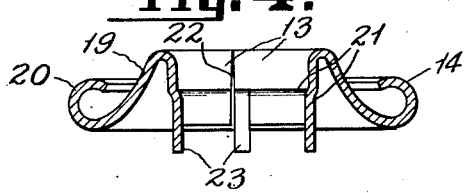
Fig. 4 is a sectional view of a socket blank employed in forming the sockets shown in Figs. 1–3, prior to assemblage of the ring thereon and formation of the projecting stud engaging ends of the gripper fingers of the socket.
Figure 5:
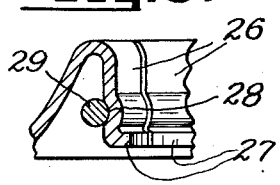
Fig. 5 is a view similar to Fig. 2 showing only a part of a socket member and showing a modification.

In Fig. 5 of the drawing is shown a slight modification of the construction shown in Figs. 1–4 inclusive, wherein the gripper fingers 26 are provided, adjacent the lower inturned gripper ends 27 thereof, with inwardly beaded or circumferentially grooved portions 28 which will form between the collective fingers of the socket member an annular recess for the reception of a split spring ring 29.

Figure 6:
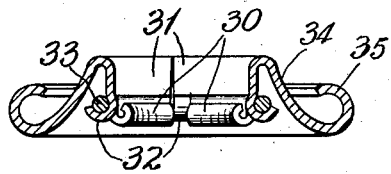
Fig. 6 is a view similar to Fig. 2 showing another form of socket member.
Figure 7:
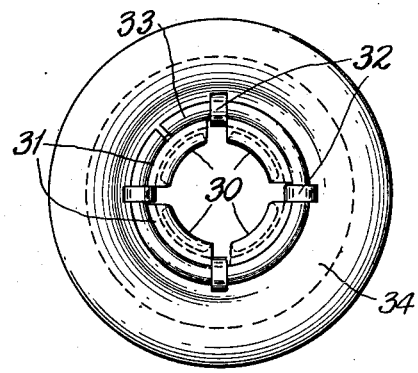
Fig. 7 is a bottom plan view of the socket member shown in Fig. 6.

In Figs. 6 and 7 of the drawings are shown other modifications which differ from the structure shown in Figs. 1–4 inclusive, simply in providing inwardly curved or beaded gripper ends 30 on the gripper fingers 31 rather than the offset flanges, as at 15 in Figs. 1-4. Otherwise, the structure of Fig. 6 is the same as that shown in Figs. 1-4. In other words, each finger 31 will include the outwardly curved hook-shaped ring supporting and retaining member 32, which supports a split spring ring 33 upon the outer surface of the fingers 31. The socket member is also provided with the outwardly flared wall 34 similar to the wall 19 terminating with the peripheral inturned curved flange 35.

Figure 8:
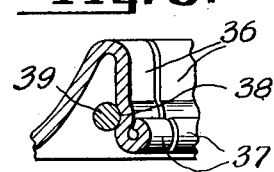
Figs. 8 and 9 are views similar to Fig. 5 showing other forms of socket members which we employ.

In Fig. 8 of the drawing is shown another slight modification which differs from the structure shown in Fig. 5 in that the gripper fingers 36 are provided with inwardly curved or rounded beaded ends 37 instead of the flanges 27, the fingers 36 having the grooves 38 similar to the grooves 28 for supporting a split spring ring 39 against displacement from other surfaces of the fingers 36.

Figure 9:
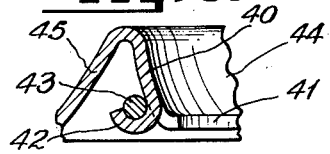

In Fig. 9 of the drawing is shown another modification of the construction illustrated in Figs. 1-4 inclusive, wherein the gripper fingers, instead of having inwardly offset portions as at 21 in Fig. 4 of the drawing, are provided with wall portions 40 which taper inwardly or, in other words, are contracted toward the lower ends of the fingers which include the inturned gripper flanges 41 similar to the flanges 27. With this construction, the outwardly extending hook-shaped members 42 continue from the walls 40 without leaving any projecting member in the bore of the socket or upon inner surfaces of the gripper fingers. The members 42 support and retain a split spring ring 43 against displacement from outer surfaces of the gripper fingers employed. In Fig. 9 of the drawing only one finger is indicated in part at 44 and at 45 is shown the outer wall of the socket similar to the wall 19 of Fig. 2. The construction in Fig. 9 will provide a greater clearance within the bore of the socket, adapting the socket to studs having larger heads.

Having fully described our invention, what we claim as new and desire to secure by Letters Patent is:

1. In snap fasteners, a socket part having a tubular stud receiving portion defined by circumferentially arranged yieldable members, an imperforated wall extending integrally from one end of said members and circumferentially enveloping said members, the other end of said members terminating in inwardly directed stud engaging projections, a spring ring arranged upon outer surfaces of said members adjacent the second named end thereof, and means on said members retaining said ring against accidental displacement therefrom.

2. In snap fasteners, a socket part having a tubular stud receiving portion defined by circumferentially arranged yieldable members, an imperforated wall extending integrally from one end of said members and circumferentially enveloping said members, the other end of said members terminating in inwardly directed stud engaging projections, a spring ring arranged upon outer surfaces of said members adjacent the second named end thereof, means on said members retaining said ring against accidental displacement therefrom, and said means comprising outwardly curved fingers formed from the material of said members.

3. In snap fasteners, a socket part having a tubular stud receiving portion defined by circumferentially arranged yieldable members, an imperforated wall extending integrally from one end of said members and circumferentially enveloping said members, the other end of said members terminating in inwardly directed stud engaging projections, a spring ring arranged upon outer surfaces of said members adjacent the second named end thereof, means on said members retaining said ring against accidental displacement therefrom, said means comprising outwardly curved fingers formed from the material of said members, and the wall portion of said members converging from the first named end thereof to the second named end thereof.

4. In snap fasteners, a socket part having a tubular stud receiving portion defined by circumferentially arranged yieldable members, a rigid wall extending integrally from one end of said members and circumferentially enveloping said members, the other end portion of said members being offset inwardly, the offset portion of said members terminating at their ends in inwardly directed stud engaging flanges, and means engaging all of said members for reinforcing the yieldable properties of said members.

5. In snap fasteners, a socket part having a tubular stud receiving portion defined by circumferentially arranged yieldable members, a rigid wall extending integrally from one end of said members and circumferentially enveloping said members, the other end portion of said members being offset inwardly, the offset portion of said members terminating at their ends in inwardly directed stud engaging flanges, means engaging all of said members for reinforcing the yieldable properties of said members, said last named means comprising a spring ring, and means on said members retaining the ring against displacement therefrom.

6. In snap fasteners, a socket part having a tubular stud receiving portion defined by circumferentially arranged yieldable members, a rigid wall extending integrally from one end of said members and circumferentially enveloping said members, the other end portion of said members being offset inwardly, the offset portion of said members terminating at their ends in inwardly directed stud engaging flanges, means engaging all of said members for reinforcing the yieldable properties of said members, said last named means comprising a spring ring, means on said members retaining the ring against displacement therefrom, and said last named means comprising grooved portions on outer surfaces of said members.

7. In snap fasteners, a socket part having a tubular stud receiving portion defined by circumferentially arranged yieldable members, a rigid wall extending integrally from one end of said members and circumferentially enveloping said members, the other end portion of said members being offset inwardly, the offset portion of said members terminating at their ends in inwardly directed stud engaging flanges, means engaging all of said members for reinforcing the yieldable properties of said members, said last named means comprising a spring ring, means on said members retaining the ring against displacement therefrom, and said last named means comprising outwardly extending hook-shaped fingers.

8. In snap fasteners, a socket part having a tubular stud receiving portion defined by circumferentially arranged yieldable members, a rigid wall extending integrally from one end of said members and circumferentially enveloping said members, the other end portion of said members being offset inwardly, the offset portion of said members terminating at their ends in inwardly directed stud engaging flanges, means engaging all of said members for reinforcing the yieldable properties of said members, said last named means comprising a spring ring, means on said members retaining the ring against displacement therefrom, and said flanges being curved.

9. In snap fasteners, a socket part having a tubular stud receiving portion defined by circumferentially arranged yieldable members, a rigid wall extending integrally from one end of said members and circumferentially enveloping said members, the other end portion of said members being offset inwardly, the offset portion of said members terminating at their ends in inwardly directed stud engaging flanges, means engaging all of said members for reinforcing the yieldable properties of said members, said last named means comprising a spring ring, means on said members retaining the ring against displacement therefrom, said last named means comprising grooved portions on outer surfaces of said members and said flanges being substantially cylindrical in cross-sectional form.

10. In snap fasteners, a socket forming part, said part comprising a ring-like body having a stud receiving bore defined by circumferentially arranged yieldable members, said body forming means integrally uniting the members at one end, the other free end of each of said members having inwardly projecting flanges, a spring ring enveloping said members, and means on said members retaining the ring against displacement therefrom.

11. In snap fasteners, a socket forming part, said part comprising a ring-like body having a stud receiving bore defined by circumferentially arranged yieldable members, said body forming means integrally uniting the members at one end, the other free end of each of said members having inwardly projecting flanges, a spring ring enveloping said members, means on said members retaining the ring against displacement therefrom, and said last named means comprising outwardly extending hook-shaped fingers formed from one side portion of each of said members.

12. In snap fasteners, a socket forming part, said part comprising a ring-like body having a stud receiving bore defined by circumferentially arranged yieldable members, said body forming means integrally uniting the members at one end, the other free end of each of said members having inwardly projecting flanges, a spring ring enveloping said members, means on said members retaining the ring against displacement therefrom, and said last named means comprising grooves on outer surfaces of said members.

13. In snap fasteners, a socket forming part, said part comprising a ring-like body having a stud receiving bore defined by circumferentially arranged yieldable members, said body forming means integrally uniting the members at one end, the other free end of each of said members having inwardly projecting flanges, a spring ring enveloping said members, means on said members retaining the ring against displacement therefrom, said last named means comprising grooves on outer surfaces of said members, and the flanges of said members being substantially cylindrical in cross-sectional form.

14. In snap fasteners, a socket forming part, said part comprising a ring-like body having a stud receiving bore defined by circumferentially arranged yieldable members, said body forming means integrally uniting the members at one end, the other free end of each of said members having inwardly projecting flanges, a spring ring enveloping said members, means on said members retaining the ring against displacement therefrom, said last named means comprising outwardly extending hook-shaped fingers formed from one side portion of each of said members, and the flanges of said members being substantially cylindrical in cross-sectional form.

15. In snap fasteners, a socket forming part, said part comprising a ring-like body having a stud receiving bore defined by circumferentially arranged yieldable members, said body forming means integrally uniting the members at one end, the other free end of each of said members having inwardly projecting flanges, a spring ring enveloping said members, means on said members retaining the ring against displacement therefrom, said first named means comprising an outwardly flared wall circumferentially enveloping said members, and said wall terminating in an inwardly curved annular portion.

16. In snap fasteners comprising socket and stud parts, a ring-like body forming the socket part proper of the fastener, said body comprising a central tubular portion defined by circumferentially arranged independent wall members, a downwardly and outwardly flared imperforated wall integrally united with one end of said members, and said members having inwardly offset portions at the other end thereof forming a tubular bore in said body of less diameter than the bore defined by the first named end of said members.

17. In snap fasteners comprising socket and stud parts, a ring-like body forming the socket part proper of the fastener, said body comprising a central tubular portion defined by circumferentially arranged independent wall members, a downwardly and outwardly flared imperforated wall integrally united with one end of said members, said members having inwardly offset portions at the other end thereof forming a tubular bore in said body of less diameter than the bore defined by the first named end of said members, and the offset portions of said members having at one side thereof narrow tongue portions of greater length than the remainder of said members.

PAUL E. FENTON.
OTTO J. HUELSTER.

REFERENCES CITED

The following references are of record in the file of this patent:

UNITED STATES PATENTS

| Number | Name | Date |
|---|---|---|
| 570,069 | Strickler | Oct. 27, 1896 |
| 757,237 | Simons | Apr. 12, 1904 |
| 2,300,292 | Jones | Oct. 27, 1942 |
| 2,327,554 | Purinton | Aug. 24, 1943 |

FOREIGN PATENTS

| Number | Country | Date |
|---|---|---|
| 604,116 | Germany | Oct. 15, 1934 |